5 Sheets—Sheet 2.

S. J. & G. J. SHIMER.
Variety Molding-Machine.

No. 206,360.              Patented July 23, 1878.

Witnesses:
Nat. E. Oliphant
D. D. Kane

Inventors
George J. Shimer
Samuel J. Shimer
per
Hoemer & Heylmun
Attorneys.

5 Sheets—Sheet 3.
S. J. & G. J. SHIMER.
Variety Molding-Machine.
No. 206,360. Patented July 23, 1878.
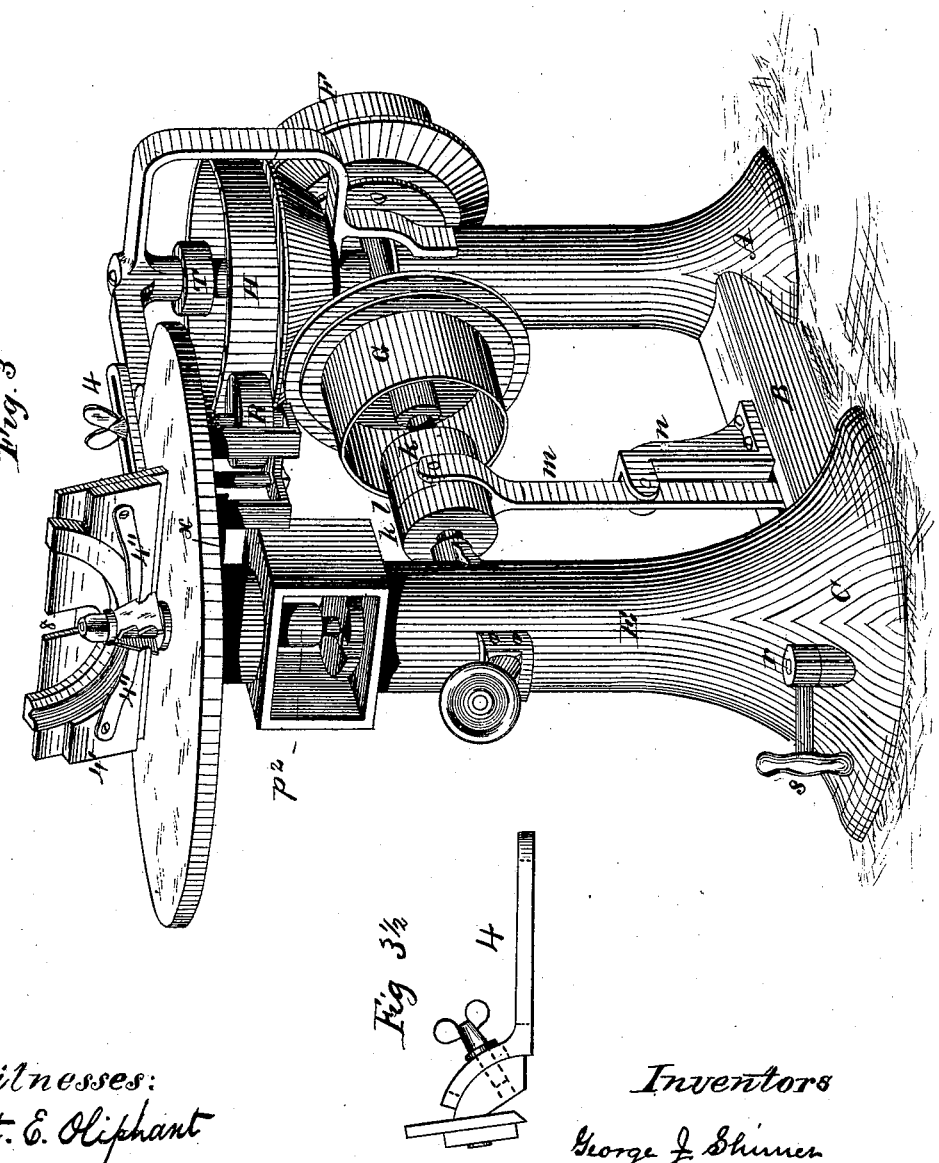
Witnesses:
Nat. E. Oliphant
D. D. Kane
Inventors
George J. Shimer
Samuel J. Shimer
per Hosmer & Heylmun
Attorneys S. J. & G. J. SHIMER.
Variety Molding-Machine.
No. 206,360. Patented July 23, 1878.
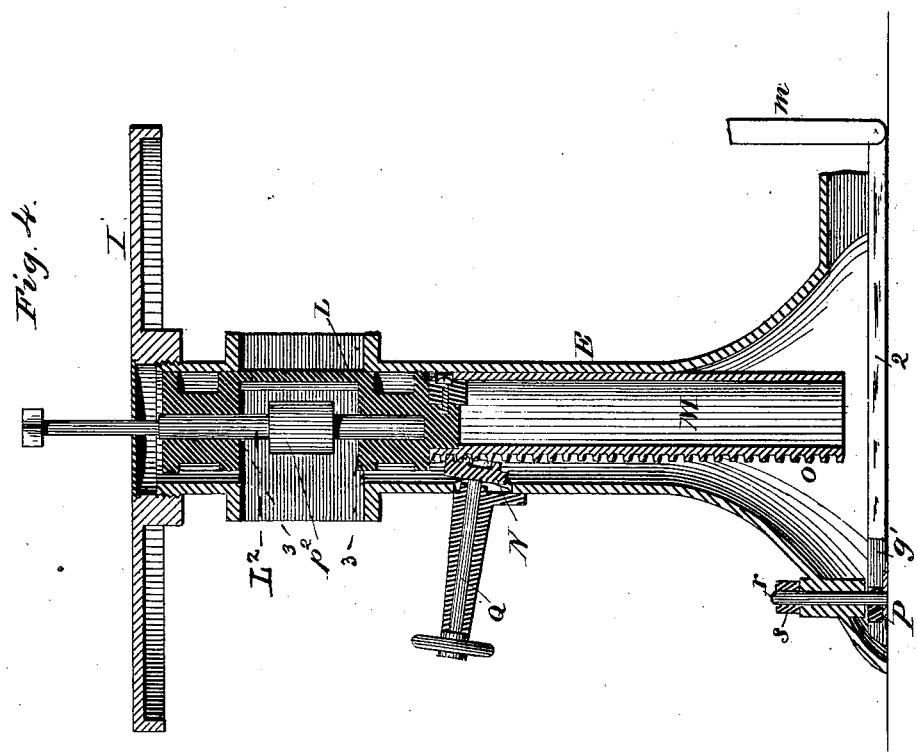
Witnesses:
Nat. E. Oliphant
D. D. Kane
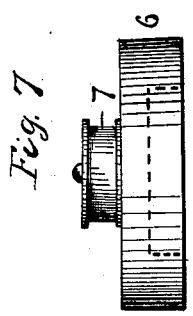
Inventors
George J. Shimer
Samuel J. Shimer
pu
Homer & Heylmun.
Attorneys.

5 Sheets—Sheet 5.
S. J. & G. J. SHIMER.
Variety Molding-Machine.
No. 206,360. Patented July 23, 1878.
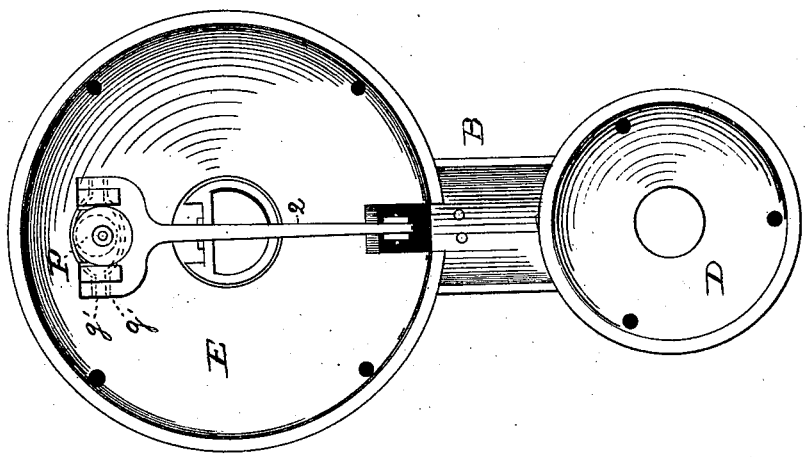
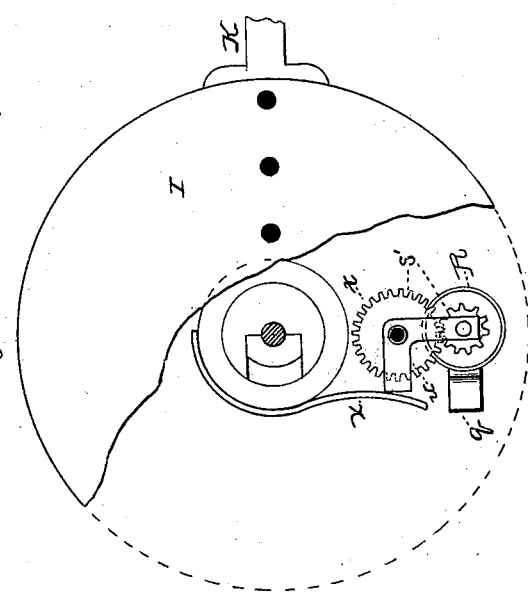
WITNESSES.
Nat. E. Oliphant
S. S. Kane
INVENTORS.
Samuel J. Shimer,
George J. Shimer.
by Hosmer & Heylmun
Attys.

UNITED STATES PATENT OFFICE.

SAMUEL J. SHIMER AND GEORGE J. SHIMER, OF MILTON, PENNSYLVANIA.

IMPROVEMENT IN VARIETY MOLDING MACHINES.

Specification forming part of Letters Patent No. 206,360, dated July 23, 1878; application filed April 29, 1878.

*To all whom it may concern:*

Be it known that we, SAMUEL J. SHIMER and GEORGE J. SHIMER, of Milton, in the county of Northumberland and State of Pennsylvania, have invented certain new and useful Improvements in Variety Molding or Reversible Shaping Machines; and we do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
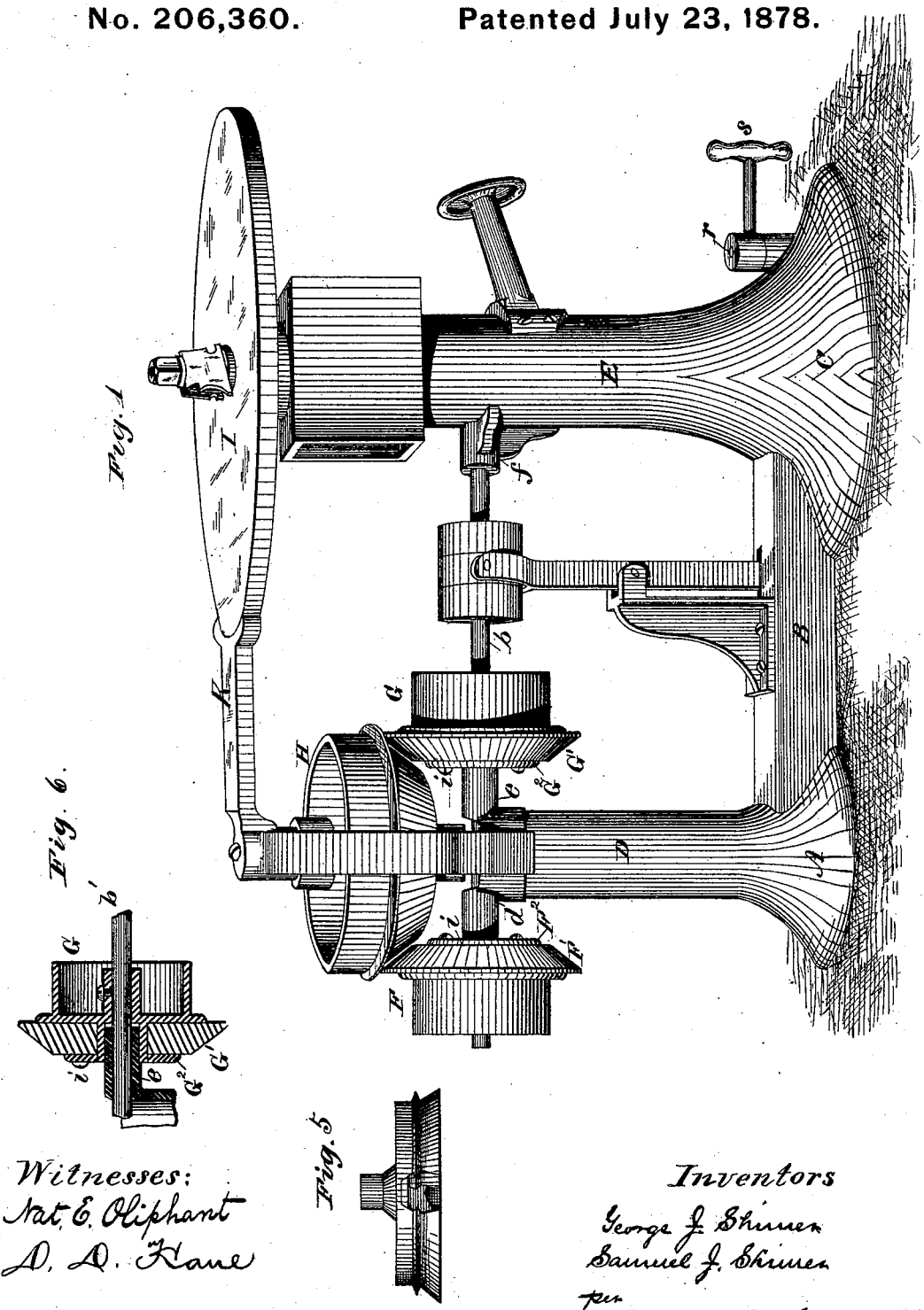
Figure 2:
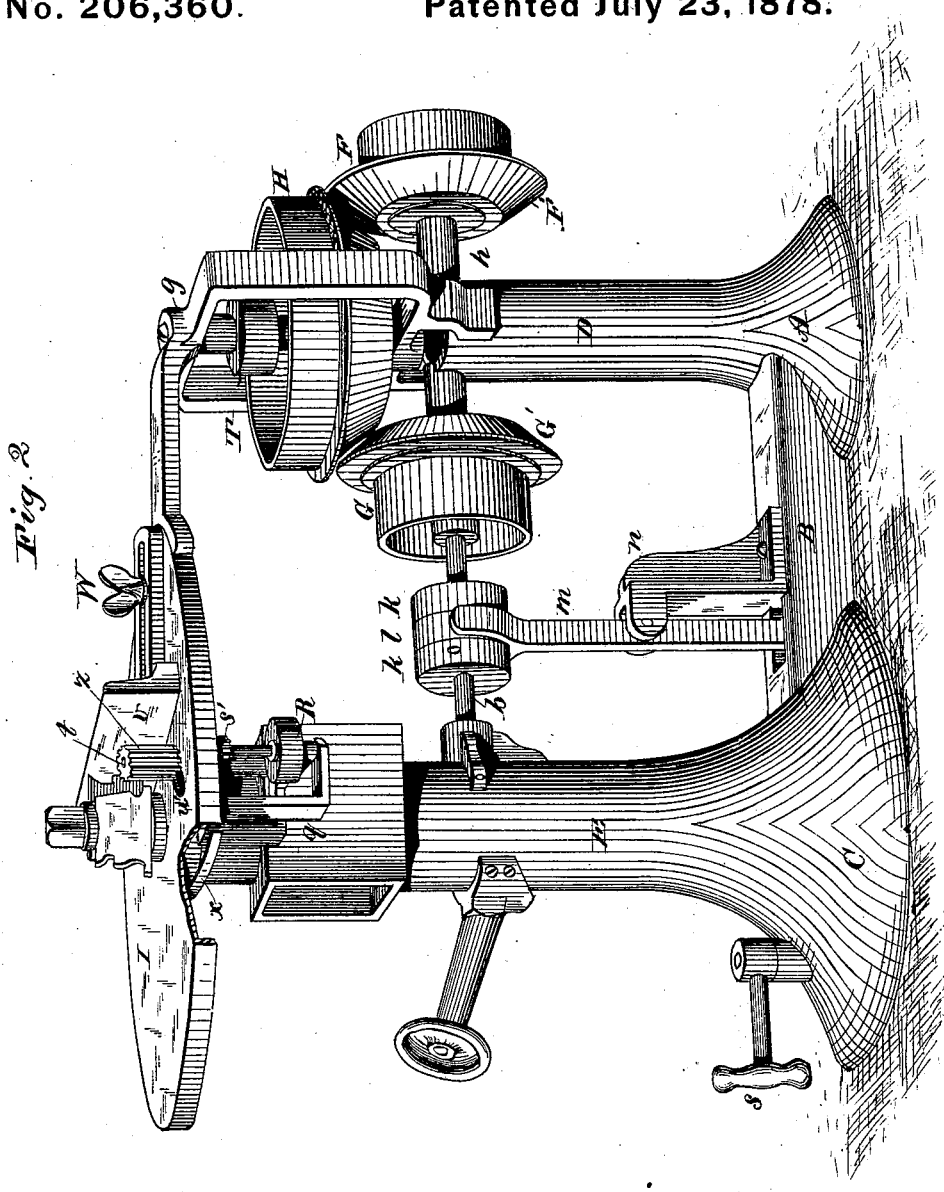

Figures 1, 2, and 3 are perspective views of our machine with the attachments applied. Fig. 3½ is a side view of the compound guide or gage. Fig. 4 is a central sectional view taken through upright E. Figs. 5 and 6 are detail views. Fig. 7 is a side view of the oval pattern. Fig. 8 is a bottom view of the machine. Fig. 9 is a view of the supporting-table, partly broken away, showing the means for supporting and operating the feed-roll.

This invention relates to that class of woodworking machines known as "variety molding or reversible shaping machines," having one upright spindle to carry the molding-knives, with cone-friction pulleys for reversing the motion, which pulleys, properly arranged, communicate full motion and admit of a reverse motion almost instantaneously, which is necessary when cross-grained or knotty lumber is molded.

Friction-gear for reversing the motion of molding-machines has heretofore been used. Therefore its employment in this connection is not broadly new with us.

Our improvements consist, first, in the special combination and construction of two tubular uprights and a hollow base or bed plate for supporting and concealing mechanism, provided with shifting and operative mechanism; secondly, in a shifting mechanism, as will be hereinafter more fully set forth; thirdly, in combination with a slotted table, a feed-roll attached to a frame suspended from the under side of the table; fourthly, in the construction of means for raising and lowering the revolving cutter-head, as will be hereinafter more fully set forth; fifthly, in the combination and arrangement of the parts, as will be hereinafter more fully set forth.

In the annexed drawings, the letters A B C represent the common base-plate or bed of the machine, to which are fastened or secured two tubular uprights, D and E, which are provided with the bearings $d$, $e$, and $f$ for the main or horizontal counter-shaft $b$, carrying two combined cone and belt pulleys, F and G, one on each side of upright D, with their obliqued or beveled faces $F^1$ $G^1$ toward each other. This upright D also supports two other bearings, as shown at $g$ $h$, in which the upper end of the upright counter-shaft has its bearings. Centrally between the two cone-pulleys F and G is arranged the cone and belt pulley H, from which motion is communicated to the spindle carrying the molding-cutters or cutter-heads, the pulley F or G of the main counter-shaft being connected by a bolt to a motive power.

The combined cone and belt pulley H is made of metal, the oblique face of which is wider than the oblique face of the two wooden cones $F^1$ $G^1$, which latter are made of thin boards clamped to the flanged face of the pulleys F G by means of ordinary screw-bolts or other suitable means.

The pulley flanges or plates $F^2$ $G^2$ have central counter-bore hubs $i$, large enough to admit the ends of the journal-bearing boxes $d$ and $e$, so that the cone-pulleys can be adjusted and fastened by means of set-screws in such a position that the supporting-boxes $d$ $e$ will be in a direct line and immediately below the frictional point of contact in the pulleys, and as the wooden cones wear they can be adjusted upon the shaft, so that the movement of the shaft endwise will need but one distance to engage with either the one side or the other of the cone-pulley H for the purpose of communicating the desired power and motion.

By this combination and arrangement of friction cone-pulleys we make the machine very compact and the reversible counter much lighter.

The shifting device for starting, stopping, and reversing the motion of the machine consists of the counter-shaft $b$, having an endwise movement, two collars, $k$ $k$, fastened to the shaft $b$ by means of set-screws and arranged between another collar, $l$, on the upper end of the forked lever $m$. This lever $m$ is pivoted to the standard $n$, and the lower end thereof connects with a shifting-arm, 2, below the hollow base-plate, as shown in Fig. 4, thereby concealing and protecting a part of the shifting mechanism from dust and foreign matter. The connecting shifting-arm 2 is moved by an eccentric, P, working between two springs, $g'$ $g'$, attached to the forward end of the arm 2. This eccentric P is fastened to one end of a vertical shaft, $r$, having at its upper end a lever, S, which may be operated by the foot. When the lever S of the shaft $r$ is placed in a direct line with the counter-shaft, the eccentric P must stand either to the right or left, the lever $m$ perpendicular, and the faces of the cone-pulleys F G at equal distances from the face of the metal cone-pulley H. It will thus be observed that, when the horizontal counter-shaft is in motion and the shifter stands in line therewith, no motion will be communicated to the other parts of the machine; but by moving the shifter either to the right or left, thereby bringing either pulley F or G in contact with pulley H, the positive or the reverse motion will be given to the operative parts of the machine.

The object of the springs $g'$ $g'$ is to give elasticity to the friction-pulleys and cause them to remain at any point, thus admitting of light or heavy pressure upon the frictional point of contact.

The main upright E supports the stationary table I and forms a connection with the upright D by means of a brace, K. This upright E is made hollow throughout its entire length, within which is nicely fitted a sliding housing, L, provided at its top and bottom with bearings 3 3 for the solid mandrel $L^2$ carrying the cutters. To the lower end of this housing is fastened, by suitable means, the attachment M, the front face of which is recessed and provided with cogs or teeth $o$ to engage with the worm-wheel N on the shaft Q, which latter is operated by a hand wheel or crank. It will be noticed that the worm-wheel N is arranged on the incline-shaft Q at an angle of about forty-five degrees to the vertical plane of the housing, the upper portion of the thread on the worm-wheel engaging with the cogs of the attachment M, working upon the principle of bevel-gearing. By this means the housing, with its solid mandrel, is raised and lowered to suit the work on the table.

By the foregoing construction of the housing and mandrel we are enabled to do away with the spindles having removable stub ends for changing to different-sized collars with larger bores. The removable stub ends of the mandrel screwed in are objectionable in the reverse motion on account of the liability to get loose and out of line. We overcome this difficulty by using a solid mandrel, and make the change by removing the housing. The mandrel receives its motion to drive the cutter-head by means of a belt from cone-pulley H to pulley $p^2$.

Having explained the machine as a shaper, we will now describe an attachment to make it useful as a small molder.

Below the table I we arrange a supporting-arm, $q$, having bearings for an upright counter-shaft and pulley, R. Communication is had by means of a belt passed over to pulley T on the shaft of cone-pulley H. The upright shaft R is provided with gearing $s'$ to give motion to the feed-shaft $t$, supported upon a frame, $u$, pivoted upon the shaft R. The upper end of the feed-shaft is provided with a feed-roll, $z$, and passes through a curved slot, $u'$, in the table, as shown in Fig. 2, and has a yielding pressure resting against it, caused by means of a spring, $x$, and the feed-shaft frame, being pivoted to the shaft R, can take any position in the slot $u'$ of the table. The feed-guide V is now secured in position by means of a set-screw W, as shown in Fig. 2 of the drawings.

This change or addition does not impair the machine as a shaper, as all the fixed parts of such change are below the table and out of the way, the feed-roll and guide being the only removable parts, the use of which converts it into a one-side molding-machine, upon which small work can be more finely finished than on the larger machines.

To make the machine useful for molding circles, the feed-roll and guide are removed and the compound guide 4 substituted. This guide is composed of two or more pieces connected together by the curved joint and set-screw, as fully shown in Fig. $3\frac{1}{2}$ of the drawings. This construction admits of adjusting the face of said guide at an angle to the revolving cutter-head having tapering cutters, and by this adjustment of the guide to the cutter-head the deepest cutting is done with the smallest diameter of the cutter. (See Fig. 3 of the drawings.)

To mold sections of circles or arcs we use a wooden pattern, 4', provided with holding-springs 4'', attached to the compound gage 4.

To mold ovals we use a board or pattern, 6, (see Fig. 7,) cut to the size and shape wanted, upon the face of which and along its outer edge is fastened the oval to be molded. To adjust the same in position the guide 4 is moved back and the oval pattern is secured against the face of said guide in such a manner that it is free to revolve upon a common center coincident with the oval pattern, and at right angles, or other suitable angle, with the cutter-head. Now secure the guide in its proper place. When the cutters mold deep enough, move the oval pattern once around upon its center 7, which rises and lowers in a slot, 8, in the inclined guide-face plate, and keeps the outer edge of board or pattern against the table. The material to be molded is caused to move upon the face of the guide placed at an angle to the revolving cutter-head. The axial line of the circle to be molded, with the axial line of the revolving cutter-head, will always form an obtuse angle, which angle must vary with the diameter of the circle to be molded and the width of molding to be formed.

For crozing barrels, kegs, and other similar articles, the cutters are removed, and the flanged head-cutter shown in Fig. 5 substituted.

The operation of crozing is to place the barrel upon the table I and bring the inside of the barrel in contact with the crozing-tool, the flange of said tool operating as a protection and guide. The depth of croze is governed by the solid part of the flange above the cutter.

By the arrangement of the table in the manner above described we obtain a solid base for the barrel to rest upon and a bearing for the crozing-tool, which prevents any vibration or unsteady motion, which necessarily takes place when the barrel is arranged on an independent table, while the crozing-tool is applied to the end of the stave farthest from the table.

Having described the machine somewhat fully, and its several uses, what we claim as new, and desire to secure by Letters Patent, is—

1. The combination, as hereinbefore described, of the two tubular uprights D E, with bearings, the hollow bed or base B, connecting the uprights at the base, the endwise-movable counter-shaft $b$, arranged in the bearings near the upper ends of the uprights, the shifting mechanism, a portion of which is concealed by the hollow base, and the friction-gear, all constructed and arranged to operate as set forth.

2. The adjustable combined belt-pulley and bevel-cone herein described, with the recessed hub $i$, for the purpose explained.

3. In a reversible shaping machine, the combination of the lever-arm S, having an eccentric, P, attached at its lower end, and working between two springs, $g'$ $g'$, on the shifting-bar, with a pivoted lever, $m$, having collar $l$ encircling the counter-shaft $b$, substantially as and for the purpose set forth.

4. The combination of the lever S, eccentric P, shifting-rod 2, pivoted forked lever $m$, collar $l$, counter-shaft $b$, and pulleys F, G, and H, substantially as and for the purpose set forth.

5. The combination, as hereinbefore described, with the tubular upright E, supporting at its upper end the stationary table I, of the movable housing L, constructed with the bearings 3 3, and the rack attachment M, the vertical mandrel $L^2$, journaled in the bearings 3 3 of the housing, and the worm-wheel N, arranged at the lower end of the inclined shaft Q and engaging with the cogs of the attachment M, all constructed and arranged as shown and described.

6. In combination with the table I, having a curved slot, $w'$, a supporting-frame suspended to the under side thereof and carrying a feed-roll, which passes upwardly through the said slot, for the purpose set forth.

7. In combination with the slotted table I, having a guide or gage, the self-adjusting feed-roll $z$, passing upwardly through the slot in said table, and operated by driving mechanism, substantially as described.

8. In a molding-machine, the combination, with revolving cutters, of the pattern 6, with center 7, adapted to receive the object to be molded, and the compound guide 4, having slot 8 in its face-plate, operated in the manner as set forth.

In testimony that we claim the foregoing as our own we affix our signatures in presence of two witnesses.

SAMUEL J. SHIMER.
GEO. J. SHIMER.

Witnesses:
THOS. J. KISTER,
L. K. ETTINGER.